United States Patent
Wetzig

(10) Patent No.: US 8,915,122 B2
(45) Date of Patent: Dec. 23, 2014

(54) SNIFFING LEAK DETECTOR

(75) Inventor: Daniel Wetzig, Köln (DE)

(73) Assignee: Inficon GmbH, Cologne (DE)

( * ) Notice: Subject to any disclaimer, the term of this patent is extended or adjusted under 35 U.S.C. 154(b) by 383 days.

(21) Appl. No.: 13/201,606

(22) PCT Filed: Feb. 5, 2010

(86) PCT No.: PCT/EP2010/051427
§ 371 (c)(1),
(2), (4) Date: Jan. 25, 2012

(87) PCT Pub. No.: WO2010/094582
PCT Pub. Date: Aug. 26, 2010

(65) Prior Publication Data
US 2012/0118048 A1    May 17, 2012

(30) Foreign Application Priority Data
Feb. 21, 2009   (DE) .......................... 10 2009 010 064

(51) Int. Cl.
*G01M 3/04*   (2006.01)
*G01M 3/20*   (2006.01)

(52) U.S. Cl.
CPC ..................... *G01M 3/205* (2013.01)
USPC .......................................................... 73/40.7

(58) Field of Classification Search
CPC .................................. G01M 3/20; G01M 3/202
USPC .......................................................... 73/40.7
See application file for complete search history.

(56) References Cited

U.S. PATENT DOCUMENTS

| | | | |
|---|---|---|---|
| 3,885,931 A * | 5/1975 | Schaller | 95/269 |
| 4,776,207 A | 10/1988 | Holme | |
| 2009/0277250 A1 | 11/2009 | Wetzig | |
| 2010/0005861 A1 * | 1/2010 | Wetzig et al. | 73/40.7 |

FOREIGN PATENT DOCUMENTS

| | | |
|---|---|---|
| DE | 37 15 452 A1 | 11/1987 |
| DE | 41 40 366 A1 | 6/1993 |
| DE | 100 31 882 A1 | 1/2002 |
| DE | 10 2006 047 856 A1 | 4/2008 |
| DE | 10 2006 056 215 A1 | 6/2008 |
| EP | 0 344 345 A1 | 12/1989 |

* cited by examiner

*Primary Examiner* — Peter Macchiarolo
*Assistant Examiner* — Alex Devito
(74) *Attorney, Agent, or Firm* — Craig Metcalf; Kriton McConkie

(57) ABSTRACT

The invention relates to a sniffing leak detector comprising a sniffing line (11) and a feed line (33) that leads to a vacuum pump (16). A distribution point (24) from which a branch line (25) leads to a test gas sensor (15) is provided on the feed line (33). In order for the intermediate pressure (P2) at the distribution point (24) to be independent of feed fluctuations of the vacuum pump (16), a throttle (D2) comprising a supercritically operated orifice (20) is provided between the distribution point (24) and the vacuum pump (16). The pressure drop at the orifice (20) is greater than half the intermediate pressure (P2) at the distribution point (24). The flow at the orifice (20) is thus blocked, wherein the flow (Q) remains constant regardless of changes of the pump pressure (P3). Changes of the intermediate pressure (P2) are thus prevented so that the sensitivity and signal stability of the test gas sensor (15) is unaffected by changes of the pump pressure.

13 Claims, 3 Drawing Sheets

SNIFFING LEAK DETECTOR

Figure 1:
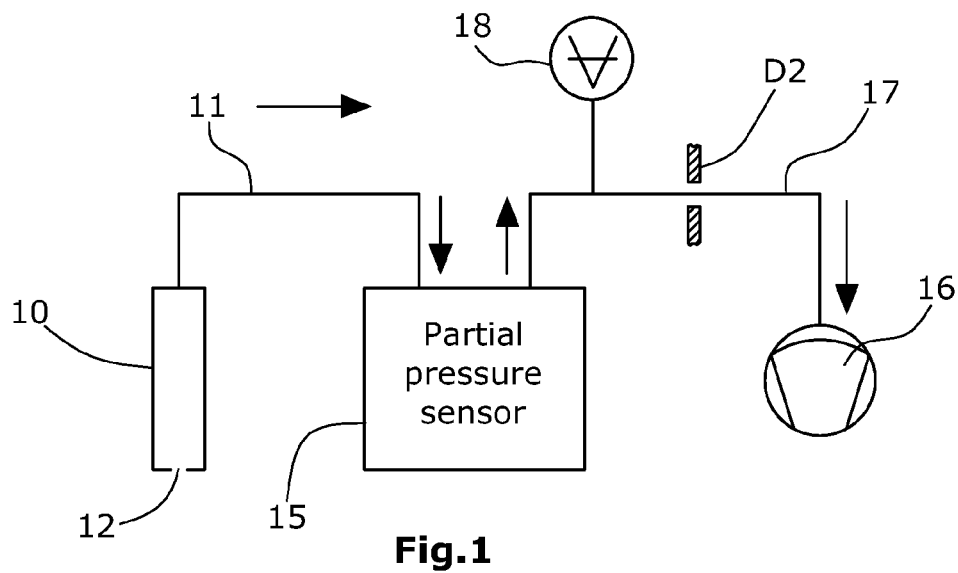

This application is a National Stage of International Application No. PCT/EP2010/051427, filed Feb. 5, 2010, and entitled SNIFFING LEAK DETECTOR, which claims the benefit of DE 10 2009 010 064.4, filed Feb. 21, 2009. This application claims priority to and incorporates herein by reference the above-referenced applications in their entirety.

The invention relates to a sniffing leak detector comprising a sniffing line, a vacuum pump connected to the sniffing line via a throttle, and a test gas sensor, with a distribution point (24) being formed upstream of the throttle and having a branch line leading therefrom to the test gas sensor.

A sniffing leak detector of the above type is described in DE 10 2006 047 856 A1 (INFICON GmbH). Said sniffing leak detector comprises a sniffing line with a sniffing probe provided at its end. At its inlet, the above apparatus includes a throttle so that, when the sniffing line has been withdrawn, it will be prevented that the full atmospheric pressure is generated at a distribution point. From said distribution point, a line including a throttle leads to the inlet of a vacuum pump. Said throttle will define the suction speed for the normal operating mode. The throttle is circumvented by a bypass line including a valve. The test gas generator is a partial pressure sensor as described in DE 100 31 882 A1. This partial pressure sensor comprises a chamber which is closed by membrane that is selectively permeable to a test gas (helium). Arranged within said chamber is a Penning pressure sensor or another pressure sensor generating an electric signal indicative of the pressure. From this pressure, there will be derived the signal for the detected quantity of test gas.

Further, sniffing leak detectors are known which include a mass spectrometer for use as test gas sensor. For operation of the mass spectrometer, a high vacuum is required. This necessitates the use of a complex high vacuum pump. In both of the above types of test gas sensors, the detection sensitivity is dependent on the intermediate pressure (total pressure) in the inlet area of the test gas sensor. For this reason, the detection limit in a sniffing leak detector is limited and dependent on the stability of the total pressure at the distribution point and respectively at the detection inlet.

In a helium sniffing leak detector, fluctuations of the total pressure will be directly evident because fluctuations of the measurement signal are caused already by the basic signal of the system, due to the helium in the atmosphere. In coolant-type leak detectors, wherein a coolant is used as a leak test gas, the influence of the total-pressure stability is evident only when measuring the leakage rate, since the air is normally free of coolant.

The total pressure (intermediate pressure) at the distribution point is given by the flow through the conveying line and the suction capacity of the conveying vacuum pump. The total pressure which will be reached during operation of a specific vacuum pump can neither be exactly predetermined, nor is it constant. During operation of the pump, this total pressure may undergo sudden changes. Particularly in cases where a membrane pump is used as a vacuum pump, such pressure changes can happen. These fluctuations of the total pressure have an adverse effect on the detection sensitivity of the sniffing leak detector. If the total pressure is relatively high, also the partial pressure of the test gas is high. This will result in a high detection sensitivity. In case of a low total pressure, the detection sensitivity will be correspondingly lower.

It is an object of the invention to provide a sniffing leak detector wherein the detection sensitivity is not impaired by fluctuations of the suction capacity of the vacuum pump.

The sniffing leak detector according to the invention is defined by claim 1. It is characterized in that the throttle provided between the sniffing line and the vacuum pump behind the distribution point is a circular orifice having such a conductance value that the pressure drop at the orifice is larger than $P_2/2$, with $P_2$ being the intermediate pressure at the distribution point.

According to the invention, the gas flow on its way from the sniffing line to the vacuum pump is blocked by an orifice. In a blocked flow, the flow is independent from the low pressure on the outlet side of the orifice. This means that, in case of fluctuations of the pump pressure at the inlet of the vacuum pump, the flow through the orifice will not be changed. Consequently, also the pressure on the inlet side of the vacuum pump will not be changed. As a result, occurring pressure fluctuations upstream of the vacuum pump have no consequences for the sensitivity and the signal stability, and the sensitivity of the system is independent from the pressure upstream of the vacuum pump.

According to the invention, said throttle is an orifice, wherein the length L of the orifice is smaller than the hole diameter D. In difference to a throttle comprising a capillary channel, the orifice has the effect that the flow is independent from the low pressure. Such an effect does not occur in other types of throttles.

The above indicated relationship according to which the pressure drop at the orifice is larger than $P_2/2$ is to say, expressed in a different manner, that the conductance value $L_B$ of the orifice is smaller than one half the suction capacity S of the vacuum pump. By using an orifice with high flow resistance (=low conductance value), the curve indicating the dependence of the flow on the pump pressure will develop a horizontal portion for low pump pressures. It is in the region of this horizontal portion that the inventive sniffing leak detector will work.

The test gas sensor of the sniffing leak detector can be a partial pressure sensor or a mass spectrometer. In case of a partial pressure sensor, e.g. as provided by Wise Technology of Inficon GmbH, the partial pressure of the test gas can be detected without high vacuum conditions. As an alternative thereto, a mass spectrometer can be used as a test gas sensor, in which a small portion of the gas conveyed by the vacuum pump will be branched off into a high vacuum region and be guided to the analyzing unit. Also in this case, the orifice will keep the total pressure at the inlet of the analyzing unit at a constant level.

An exemplary embodiment of the invention will be explained in greater detail hereunder with reference to the drawings.

In the drawings—

Figure 2:
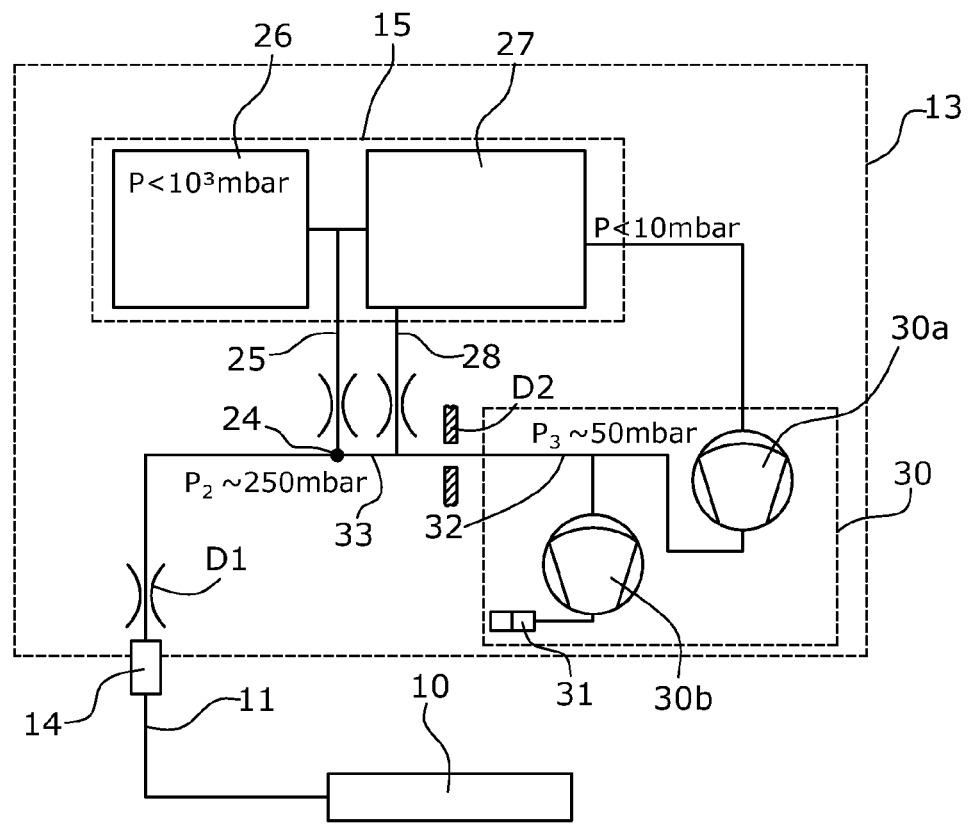
Figure 3:
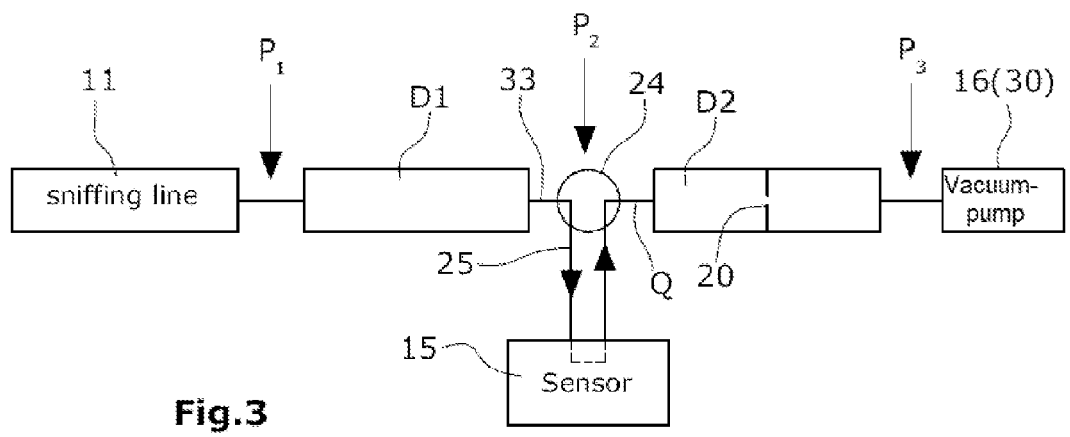
Figure 4:
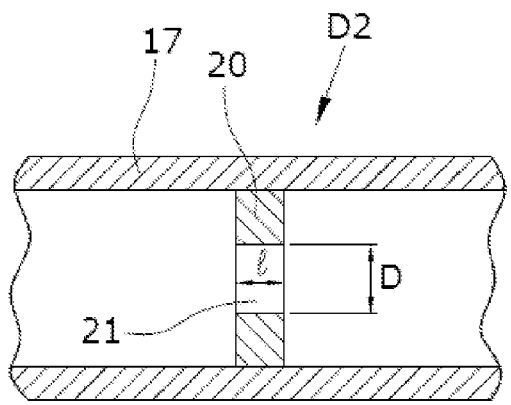
Figure 5:
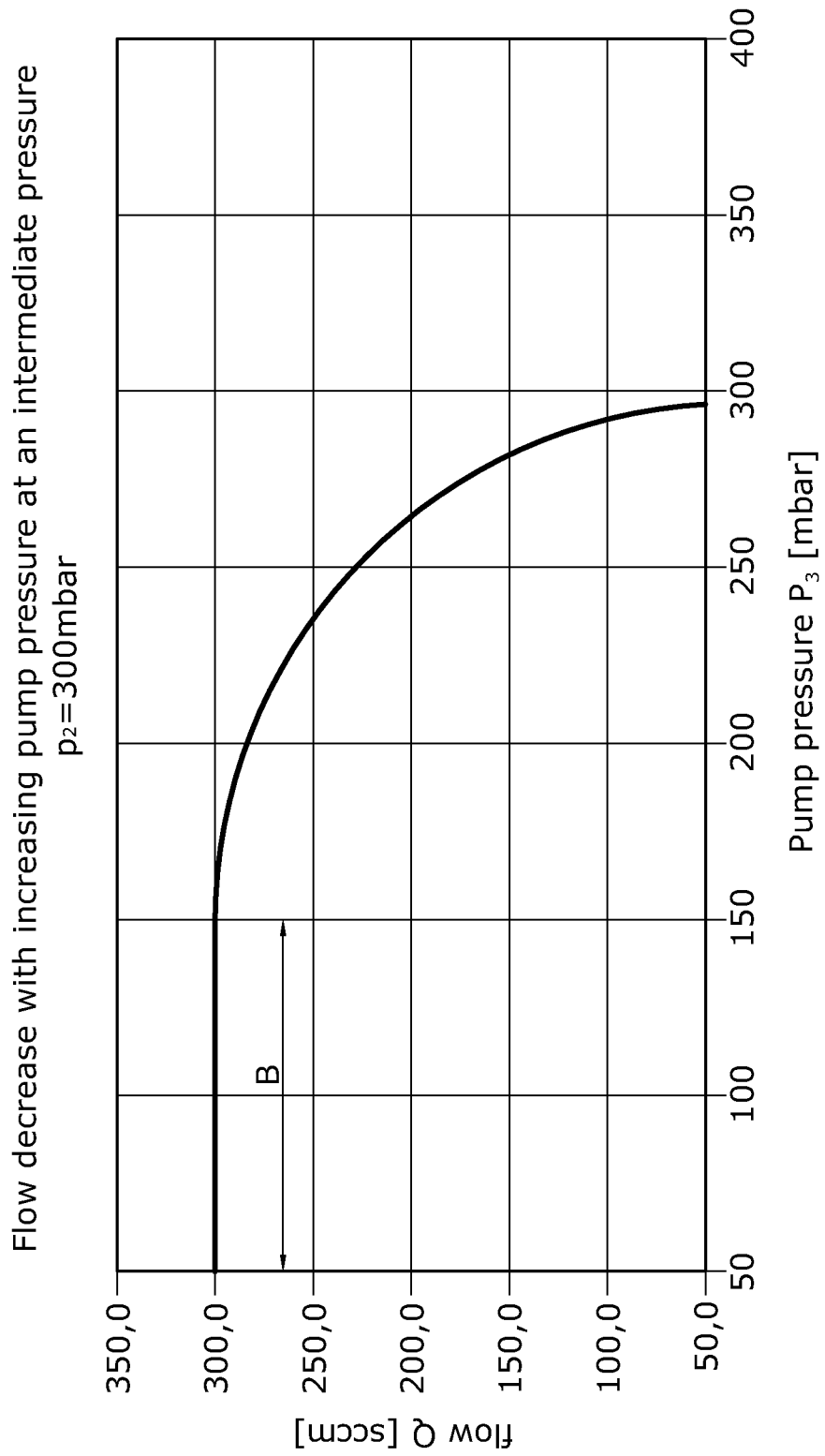

FIG. 1 is a schematic partial view of a sniffing leak detector with partial pressure sensor according to the invention, FIG. 2 is a schematic partial view of a sniffing leak detector with mass spectrometer according to the invention, FIG. 3 is a schematic partial view of the sniffing leak detector with indication of the pressure parameters, FIG. 4 is a longitudinal sectional view of the orifice, and FIG. 5 is a graphical representation of the decrease of the flow with increasing pump pressure at the inlet of the vacuum pump, with an intermediate pressure $P_2$ of 300 mbar.

To a sniffing probe 10, there is connected a sniffing line 11 formed as a capillary line. At the inlet 12 of sniffing probe 10, an atmospheric pressure of about 1000 mbar prevails. The flow Q through the sniffing line is e.g. 100 sccm (standard cubic centimeters per minute). Said sniffing line leads to the test gas sensor 15 which herein is designed as a partial pressure sensor according to DE 100 31 882 A1. At the inlet of the test gas sensor, a pressure p of about 250 mbar prevails. Between the test gas sensor 15 and a vacuum pump 16, a conveying line 17 extends which includes the throttle D2. The inlet side of throttle D2 is connected to a pressure measuring unit 18. The vacuum pump 30 comprises e.g. a two-stage membrane pump.

The configuration of the throttle D2 is illustrated in FIG. 4. The throttle comprises an orifice 20 made of a plane wall arranged transversely in suction line 17. Orifice 20 includes a hole 21 which is of a circular shape, for instance. The length L of the orifice in the flow direction, i.e. the thickness of the wall, is smaller than the diameter D of the hole 21.

FIG. 2 shows a sniffing leak detector with mass spectrometer. A sniffing probe 10 is connected via a sniffing line 11 to the casing 13 of the sniffing leak detector, this connection being realized in the form of a plug-type connection 14. Arranged within casing 13 is a throttle D1 in the form of an inlet aperture, preventing an increase of the suction line pressure to atmospheric pressure upon release of said plug-type connection 14.

The inlet line leads to a distribution point 24. From the latter, a branch line 25, including a throttle, leads to the mass spectrometer 26. The mass spectrometer needs a high vacuum for its operation. This high vacuum will be generated by a turbomolecular pump 27. Said pump comprises an intermediate inlet which is connected, via a line 28 with throttle, to the distribution point 24. The pressure outlet of turbomolecular pump 27 is connected to a fore-vacuum pump 30 which in the present case is of a two-stage design. The pressure outlet 31 leads into the atmosphere. An intermediate inlet 32 between the two stages 30a and 30b of fore-vacuum pump 30 is connected to the distribution point 24 in the conveying line 33. In this embodiment, the mass spectrometer 26 and the turbomolecular pump 27 form the test gas sensor 15.

At the distribution point 24, an intermediate pressure $P_2$ prevails. At the intermediate inlet 32 of fore-vacuum pump 30, an intermediate pressure $P_3$ prevails.

FIG. 3 is a simplified representation of the devices according to FIGS. 1 and 2. The sniffing line 11 is followed by the throttle D1. The latter is followed by the conveying line 33. At the distribution point 24 of conveying line 33, a branch line 25—with outgoing and return lines—is branching off to the test gas sensor 15. The pressure prevailing at distribution point 24 is the intermediate pressure $P_2$ or total pressure.

From distribution point 24, the conveying line 33 leads through throttle D2 and from there to vacuum pump 16 or 30.

The aim of the invention resides in keeping the intermediate pressure $P_2$ at the distribution point 24 as constant as possible, irrespective of possible fluctuations of the pressure $P_3$ or the suction capacity of the vacuum pump. This is achieved by the throttle D2 which is formed as an orifice 20.

In FIG. 5, the flow occurring under the effect of the orifice in the conveying line is represented in dependence on the pump pressure $P_3$. It can be seen that, in a blocking region B covering a pump pressure $P_3$ in the range of 50-150 bar, the flow Q and thus the pressure $P_2$ are constant, irrespective of fluctuations of the pump pressure $P_3$. At higher pump pressures, the flow Q will decrease corresponding to the depicted curve. By the effect of the orifice whose pressure drop is larger than $P_2/2$, it is accomplished that operation will be performed exclusively in blocking region B.

The invention claimed is:

1. A sniffing leak detector comprising:
  a sniffing line configured to convey gas from a sniffing probe to a test gas sensor;
  the test gas sensor that is connected to the sniffing line for receiving the gas; and
  a vacuum pump connected to the test gas sensor for creating an intermediate pressure at an inlet to the test gas sensor, the vacuum pump being connected to the test gas sensor via a throttle, the throttle comprising an orifice that is dimensioned to create a pressure drop across the orifice greater than half the intermediate pressure such that the intermediate pressure remains substantially constant even when a pressure on a downstream side of the throttle varies.

2. The sniffing leak detector of claim 1, wherein the conductance value $L_B$ of the orifice is smaller than half the pumping speed of the vacuum pump.

3. The sniffing leak detector of claim 1, wherein the length of the orifice is smaller than the orifice diameter.

4. The sniffing leak detector of claim 1, wherein the test gas sensor is a partial pressure sensor.

5. The sniffing leak detector of claim 1, wherein the test gas sensor is a mass spectrometer.

6. The sniffing leak detector of claim 1, wherein the pressure on the downstream side of the throttle varies between 50 and 150 bar while the intermediate pressure remains substantially constant.

7. A sniffing leak detector comprising:
  a sniffing probe;
  a sniffing line having a first and a second end, the first end being connected to the sniffing probe;
  a test gas sensor having an inlet and an outlet, the inlet being connected to the second end of the sniffing line;
  a conveying line having a first and a second end, the first end being connected to the outlet of the test gas sensor, the conveying line including a throttle; and
  a vacuum pump having an inlet connected to the second end of the conveying line, the vacuum pump forming a first pressure at the inlet to the vacuum pump and an intermediate pressure at the inlet to the test gas sensor, the throttle comprising an orifice that is dimensioned to create a pressure drop across the orifice that is greater than half the intermediate pressure such that the intermediate pressure remains substantially constant even when the first pressure varies.

8. The sniffing leak detector of claim 7, wherein the conductance value $L_B$ of the orifice is smaller than half the pumping speed of the vacuum pump.

9. The sniffing leak detector of claim 7, wherein the length of the orifice is smaller than the orifice diameter.

10. The sniffing leak detector of claim 7, wherein the test gas sensor is a partial pressure sensor.

11. The sniffing leak detector of claim 7, wherein the test gas sensor is a mass spectrometer.

12. The sniffing leak detector of claim 7, wherein the pressure on the downstream side of the throttle varies between 50 and 150 bar while the intermediate pressure remains substantially constant.

13. A method for maintaining an intermediate pressure constant within a sniffing leak detector, the sniffing leak detector comprising a sniffing line configured to convey gas from a sniffing probe to a test gas sensor, the test gas sensor that is connected to the sniffing line for receiving the gas, and a vacuum pump connected to the test gas sensor for creating an intermediate pressure at an inlet to the test gas sensor, the method comprising:
  connecting the vacuum pump to the test gas sensor via a throttle, the throttle comprising an orifice that is dimensioned to create a pressure drop across the orifice that is at least half the intermediate pressure;
  operating the vacuum pump at a first pressure to create the intermediate pressure at the inlet to the test gas sensor;

operating the vacuum pump at a second pressure, the second pressure being up to half the intermediate pressure and greater than the first pressure; and maintaining, via the throttle, the intermediate pressure substantially constant during the operation of the vacuum pump at the first and second pressures due to the pressure drop across the orifice being at least half the intermediate pressure.

* * * * *